United States Patent [19]

Grossman et al.

[11] Patent Number: 4,481,634
[45] Date of Patent: Nov. 6, 1984

[54] RF EXCITED METAL WAVEGUIDE LASER

[75] Inventors: Jonathan G. Grossman; Lee W. Casperson; Oscar M. Stafsudd, Jr., all of Los Angeles, Calif.

[73] Assignee: The Regents of the University of California, Berkley, Calif.

[21] Appl. No.: 489,512

[22] Filed: Apr. 28, 1983

[51] Int. Cl.³ .............................................. H01S 3/097
[52] U.S. Cl. ......................................... 372/87; 372/64
[58] Field of Search .................... 372/87, 64, 55, 83; 378/58, 62, 81

[56] References Cited

U.S. PATENT DOCUMENTS 4,169,251  9/1979  Laakmann ............................. 372/64
4,207,540  6/1980  Ernst .................................... 372/87

OTHER PUBLICATIONS

"Guided Beams in Concave Metallic Waveguides", Lee W. Casperson, et al., IEEE Journal of Quantum Electronics, vol. QE 15, No. 6, Jun. 1979.

Primary Examiner—William L. Sikes
Assistant Examiner—Léon Scott, Jr.
Attorney, Agent, or Firm—Poms, Smith, Lande & Rose

[57] ABSTRACT

An RF excited metal waveguide laser wherein one of the two opposed electrodes forming the discharge region has its top surface thereof formed as a waveguide thus eliminating the dielectric sidewalls used in prior art metal waveguide lasers. In the preferred embodiment, an enclosure having metal sidewalls and bottom has one of the electrodes attached thereto and the opposite electrode is attached to a dielectric cover on the enclosure. The laser gas can be circulated through the entire enclosure to aid in the cooling of the electrodes. The preferred shape of the waveguide electrode is with a longitudinal and transverse concave radius of curvature.

18 Claims, 8 Drawing Figures

RF EXCITED METAL WAVEGUIDE LASER

BACKGROUND OF THE INVENTION

The present invention relates to lasers and, more particularly, to RF excited metal waveguide lasers.

Recently, there has been considerable interest in waveguide gas lasers wherein the laser light propagates through a hollow waveguide which also serves to confine the laser-exciting discharge. Early forms of waveguide gas lasers are disclosed in the patent to Smith No. (3,772,661). The basic laser excitation scheme employed by Smith and used in most of the early waveguide gas lasers involved establishing a d.c. electric discharge longitudinally through a device between a pair of electrodes disposed near the respective ends of the laser waveguide. This type of discharge requires relatively large d.c. excitation voltages (i.e. about 10 kv) along with the necessary power supply and associated circuitry for generating voltages of such magnitude.

The aforementioned Smith patent also briefly discloses exciting a ring-type waveguide laser from an r.f. source by means of a coil wound about the ring-shaped waveguide. Such a coil excitation arrangement not only is incapable of providing a highly uniform discharge; but, it also affords poor coupling efficiency. Moreover, when more than a few turns are employed, the inductance of the coil itself becomes sufficiently large to limit the usable excitation frequency to below a few MHz.

In order to obtain a more uniform discharge with reduced excitation voltage, waveguide gas lasers have been developed wherein a pulsed discharge is established along a transverse waveguide dimension. Such lasers are shown in the patent to Smith et al. No. (3,815,047). Waveguide lasers of that type have been operated in a quasi-continuous mode at pulse repetition rates as high as 40 kHz, as described in the Smith et al. paper "High Repetition Rate and Quasi-CW Operation of a Waveguide $CO_2$TE laser", Optics Communications, Volume 16, no. 1 (January 1976), pp. 50–53.

In lasers employing longitudinal and transverse electric discharges according to the above-described teachings, the cathodes are usually sufficiently poor electron emitters so that positive ion current dominates in the region immediately adjacent to the cathode. As a result, a positive space charge is formed in this region. The electric fields resulting from the positive space charge cause electrons emitted from the cathode to be accelerated sufficiently so that an avalanche ionization effect occurs in the space charge region. By the outer extremity of this space charge region, the electron density is sufficiently large so that an electron dominated current occurs throughout the remainder of the discharge. In the space charge region, the discharge voltage increases very rapidly in a positive direction as a function of distance from the cathode. This is typically by about 400 to 600 volts in waveguide laser-exciting transverse discharges. As a consequence, the space charge region is often referred to as the "cathode fall" region. Throughout the remainder of the discharge, i.e., between the cathode fall region and the anode, the discharge voltage increases very slowly in a positive direction as a function of distance from the cathode.

These and other effects in the cathode fall region give rise to a number of problems in previous discharge-excited waveguide lasers. First, positive ion bombardment of the cathode has a tendency to damage the cathode, thereby limiting the life of the device. Also, the high electric fields in the cathode fall region tend to dissociate the laser gas. In addition, the relatively large cathode fall voltage wastes a substantial amount of input energy, thereby reducing operating efficiency. Further, considerable additional circuit hardware such as high voltage power supplies, current regulators, and ballast resisters may be required to provide the relatively large excitation voltages, as well as to overcome instabilities resulting from negative impedence discharges. Moreover, in pulsed transverse discharge excitation in lasers according to the prior art, the excitation pulse duration must be sufficiently short to preclude arcing, and bulky and expensive post-formation networks are required.

An improvement to the above-described lasers is shown in the patent to Laakmann No. (4,169,251). In a waveguide laser according to Laakmann, a laser gas is disposed in an elongated chamber of cross-sectional dimensions suitable for guiding laser light. A laser-exciting discharge is established in the laser gas by means of an alternating electric field applied to the chamber along a direction transverse to its length. The excitation frequency probably ranges from a value of about $V/2d$ to about $50V/d$, where $d$ is the distance across the chamber and $V$ is the drift velocity of electrons in the laser gas, having a value ranging typically from about $5\times10^6$ cm per second to about $1.5\times10^7$ cm per second. For typical laser gases and operating pressures, appropriate excitation frequencies generally lie in the VHF-UHF range, i.e., from about 30 MHz to about 3 GHz. These excitation frequencies are sufficiently high to ensure negligible interaction of discharge electrons with the electric field-applying electrodes, thereby tending to provide a discharge-excited waveguide laser which has increased operating life, reduced tendency towards laser gas dissociation, increased discharge stability and uniformity, increased operating efficiency, a significant lowering of required excitation voltages, and a substantial reduction in excitation hardware as compared to the then prior art laser devices.

A simplified drawing of a laser according to the teachings of Laakmann, generally indicated as 10, is shown in FIGS. 1 and 2, which generally correspond to FIGS. 2 and 1 respectively, of the Laakmann patent. As can be seen therein, the laser 10 has a pair of electrodes 12 and 14 which are elongated and of rectangular cross-section. The electrodes 12, 14, are disposed in parallel spaced relationship to form a discharge region 16 therebetween. The lower electrode 14 is attached to a large block 18 of copper, or the like, which both supports the electrode 14 and, more importantly, aids in cooling the electrode 14 by conduction. A pair of elongated, rectangular, ceramic blocks 20 are attached to the block 18 and electrode 14. The upper electrode 12 is also attached to the ceramic blocks 20. A pair of window members 22 are attached over the ends of the rectangular waveguide conduit 24 formed by the electrodes 12, 14 and blocks 20. The electrodes 12, 14, block 18, and window members 22 are suitably sealed to one another so that no leakage occurs with respect to the waveguide conduit 24. Laser gas 26 is placed within the conduit space 24, and the excitation circuit, generally indicated as 28, is used to excite the electrodes 12, 14 in the manner described above.

These standard, prior art, r.f. waveguide lasers, as typified by the Laakmann laser of FIGS. 1 and 2, have a rectangular cross-section in which two of the sides are the metal (typically aluminum) r.f. electrodes 12, 14, and the remaining two sides are a dielectric material (i.e. the ceramic blocks 20), the principal function of which is to confine the laser radiation into a rectangular waveguide mode. Although this design has many desirable features, as proved by its commercial success, the need for dielectric waveguide walls is a constantly remaining undesirable feature. Suitable dielectric components are costly and difficult to fabricate, and they may also limit the laser's performance and lifetime. The quantity of available laser gas is small and, consequently, among other things, the cooling of the electrode 12 by convection and conduction is poor at best, resulting in deterioration of the sidewalls of the waveguide conduit 24 with attendant shortening of life and performance of the laser.

Wherefore, it is the object of the present invention to provide an r.f. excited metal waveguide laser eliminating the dielectric sidewalls of the waveguide region and, additionally, providing a higher volume of laser gas and more efficient cooling of the components.

SUMMARY

The foregoing objective has been achieved in an r.f. excited metal waveguide laser having two parallel, opposed, longitudinal electrodes to which r.f. energy is applied to excite the laser by the improvement of the present invention comprising one of the electrodes being concave in the longitudinal direction having a radius of curvature r1 and also concave in the transverse direction along its entire length with a radius of curvature r2; and the other of the electrodes being convex in the longitudinal and transverse directions with radii of curvature r1 and r2, respectively, whereby the concave electrode also functions as a waveguide for the laser light beam.

In the preferred embodiment, one of the two electrodes is carried by the bottom of a metal structure comprising the bottom and sides of a sealed enclosure for containing laser gas; and, the other of the two electrodes is carried by a plate of dielectric material sealably closing the top of the enclosure.

Additionally, in the preferred embodiment, can be provided for circulating laser gas within the enclosure through the discharge region between the opposed surfaces of the electrodes to provide more effective cooling.

DESCRIPTION OF THE PREFERRED EMBODIMENT

Briefly, as will be described in greater detail hereinafter, the r.f. excited waveguide laser of the present invention consists of two distinct parts, the r.f. electrodes and the resonator structure. The electrodes are a set of parallel metal plates placed longitudinally between two mirrors (i.e. a laser beam output coupler and a laser beam mirror). The lower plate, the ground electrode, is also a concave metal waveguide. In addition, the ground electrode conductively cools the r.f. discharge region. The top electrode is a mirror image of the ground electrode with the exception that the top electrode has a narrower width. The discharge region is defined by the volume between the parallel, opposed surfaces of the electrodes. Therefore, by adjusting the electrode spacing and the top electrode width, it is possible to closely match the discharge region to the waveguide mode. The resonator structure consists of a vacuum-tight structure that surrounds the electrodes and holds the laser optics (the mirrors) perpendicular to the waveguide. The ground electrode is both thermally and electrically grounded to the resonator structure. The structure is constructed to provide mechanical stability between the laser mirrors.

Figure 3:
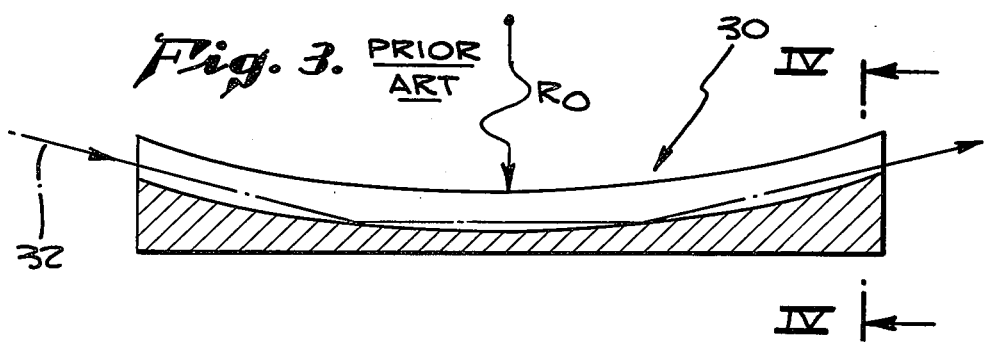
FIG. 3 is a cut away side elevation through a prior art laser waveguide.
Figure 4:
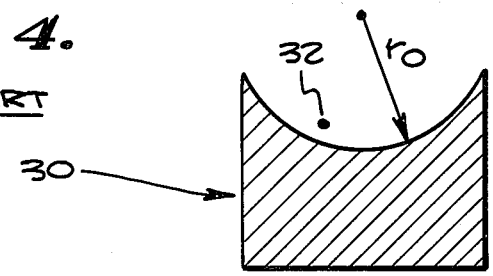
FIG. 4 is a cut away view of the waveguide of FIG. 3 in the plane IV—IV.

Referring first to FIGS. 3 and 4, a waveguide, generally indicated as 30, as employed in the present invention, is shown. The waveguide 30 is described and reported in detail by one of the coinventors of the present invention, Lee W. Casperson, along with one of his associates Tracy S. Garfield, in the IEEE Journal of Quantum Electronics, vol. QE-15, no. 6, June 1979 at pp. 491–496. The basic theory of the metal waveguide 30, as reported in the above-described article, shows that an E-M wave will propagate down a metal strip curved in both the transverse and longitudinal direction. The lowest order mode has a spot size parallel to the waveguide surface given by:

$$W_0 = \left[ \frac{2(R_0 r_0)\lambda}{K_0} \right]^{\frac{1}{2}}$$

where r0 is the transverse radius of curvature,
R0 is the longitudinal radius of curvature, and,
$K_0 = 2\pi/\lambda$ The mode is not Gaussian but Hermite Gaussian parallel to the waveguide and Airy perpendicular to the waveguide surface. The Airy functions have the property that higher order Airy functions are displaced further from the waveguide surface than the lower order Airy function. Therefore, the top electrode of a laser will truncate the higher order modes and can be positioned for single (lowest order) mode propagation. The Gaussian portion of the beam 32 does not have to propagate directly down the center of the waveguide. If introduced at an angle to the wave guide (but still parallel to the waveguide surface), the Gaussian beam 32 will oscillate in its displacement from the waveguide center. This is an important advantage for a high pressure (low gain) laser in that an oscillating beam can use the gain medium more effectively. Conversely, if an oscillating beam is not desired, the placement and curvature of the electrodes can be adjusted for efficient use of the gain media. In either case, higher efficiencies can be expected from the use of metal instead of a ceramic waveguide. Losses in the metal waveguide are also lower than the ceramic waveguide of the prior art since the beam propagates parallel to the metal. Absorption of light by even optical rough metal of high grazing angles is very small (1%/M). Therefore, even a finely sanded electrode designed to incorporate a waveguide such as that labeled 30 of FIGS. 3 and 4 will be a low loss waveguide.

Figure 5:
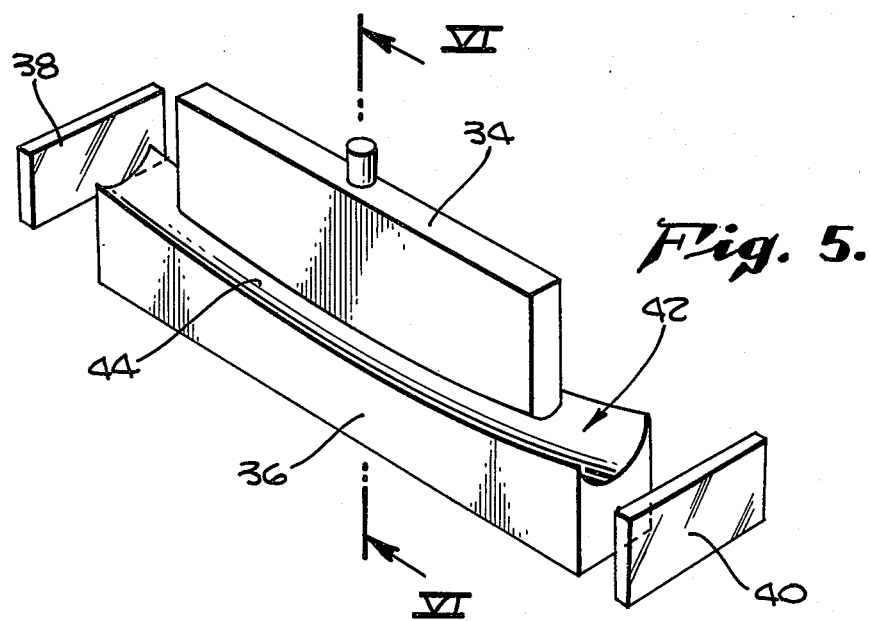
FIG. 5 is a perspective view of the two electrodes employed in the present invention.
Figure 6:
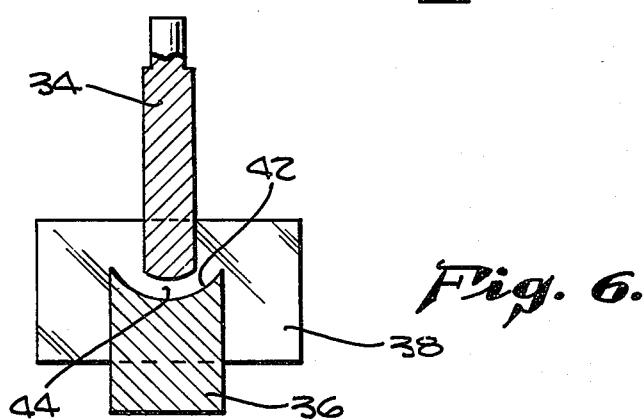
FIG. 6 is a cut away view through the electrodes of FIG. 5 in the plane VI—VI.

The electrode structure employed in the laser of the present invention is shown FIGS. 5 and 6. As shown therein, the electrodes 34 and 36 of the r.f. excited waveguide laser consist of a set of parallel metal plates 34, 36 placed longitudinally between two mirrors 38 and 40. The lower plate 36, or ground electrode, is also a concave metal waveguide as described above along the top surface 42 thereof. In addition, the ground electrode 36 conductively cools the r.f. discharge region 44. The discharge region 44 is defined by the volume between the opposed, parallel surfaces of the electrodes 34, 36. Therefore, by adjusting the spacing between the electrodes 34, 36 and the width of the top electrode 34, it is possible to closely match the discharge region 44 to the waveguide mode. For a $CO_2$ system, the discharge cross-section is typically between $1 \times 1$ mm$^2$ and $3 \times 3$ mm$^2$.

Figure 7:
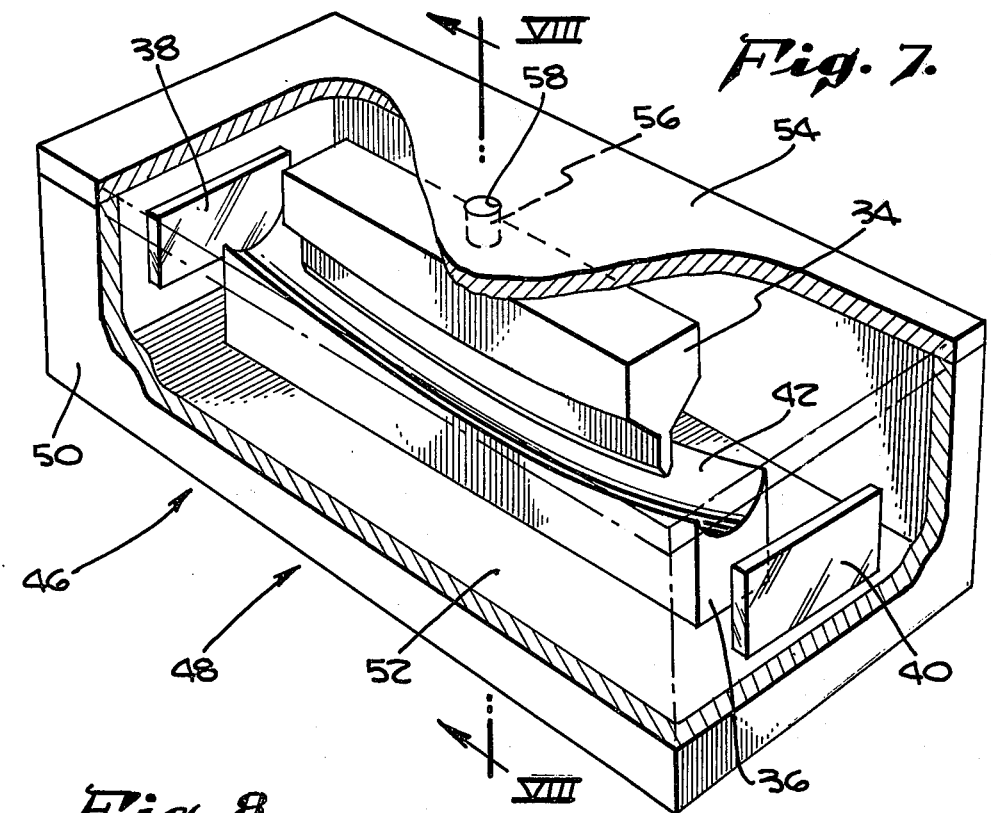
FIG. 7 is a partially cut away perspective view of a laser according to the present invention.
Figure 8:
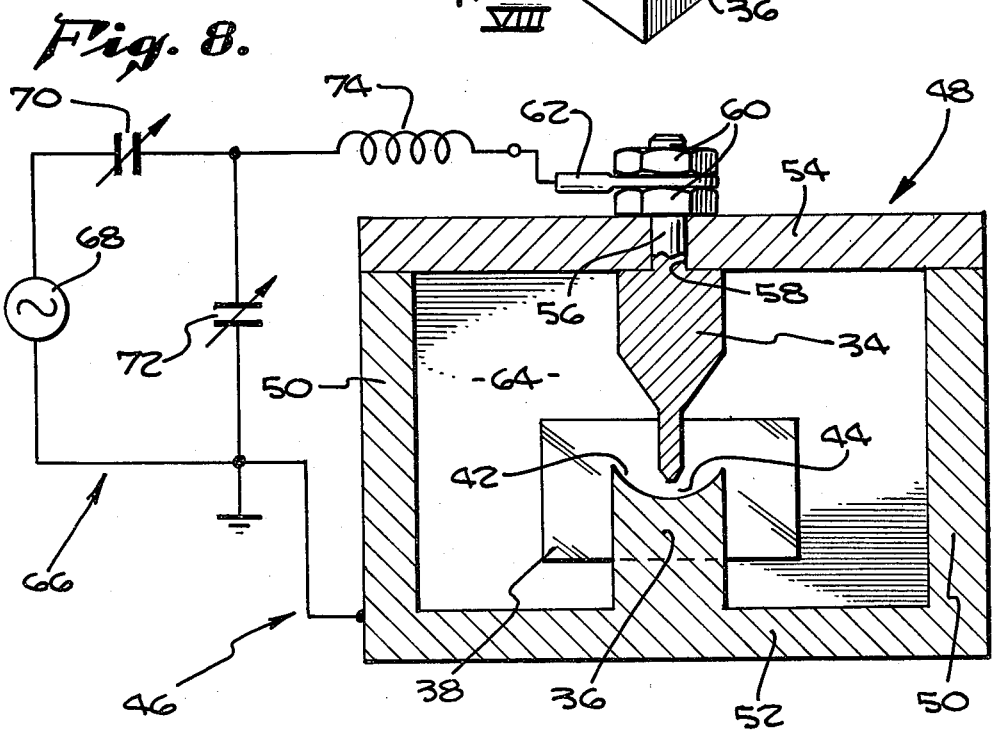
FIG. 8 is a cut away view of the laser of FIG. 7 in the plane VIII—VIII showing the connection to the excitation circuit.

Turning now to FIGS. 7 and 8, a complete laser, generally indicated as 46, according to the present invention and incorporating the electrode structure described above is shown. Laser 46 comprises a vacuum-tight enclosure 48 having metal sides 50 and a metal bottom 52 carrying the lower electrode 36. Electrode 36 can be formed into the bottom 52 or attached separately thereto. The enclosure 48 is sealed at the top with a ceramic dielectric lid 54 to which the upper electrode 34 is connected as by post 56 being fit into a corresponding hole 58. It is preferred that post 56 be threaded such that nuts 60 threadedly attached thereto can hold the upper electrode 34 to the lid 54 and, additionally, provide for a site of electrical connection to the upper electrode 34 as with the connector 62.

The mirrors 38 and 40 (i.e. the beam output coupler and the beam mirror) are set into the sidewalls 50 in opposition to one another and with the upper surface 42 of the lower electrode 36 comprising the waveguide longitudinally aligned between the mirrors 38, 40. As can be seen, in this embodiment, the top electrode has been considerably thinned where the opposed, parallel adjacent surfaces of the electrodes 34, 36 are in opposition to one another. It should be noted that despite the relative width between the facing or opposed surfaces of the electrodes 34, 36, the radii in the transverse and longitudinal direction of the electrodes 34, 36 are identical such that the opposed surfaces defining the upper and lower boundaries of the discharge region 44 are parallel in both the transverse and longitudinal directions.

Laser gas 64 is disposed within the enclosure 48. The open shape of the interior of the enclosure 48 vis-a-vis the electrodes 34, 36 provides means for circulating the laser gas 64 through the discharge region 44 by forced or natural convection. If desired, mechanical means could be provided to positively circulate the gas 64. In either case, the result is an increased cooling capability over the prior art.

Figure 1:
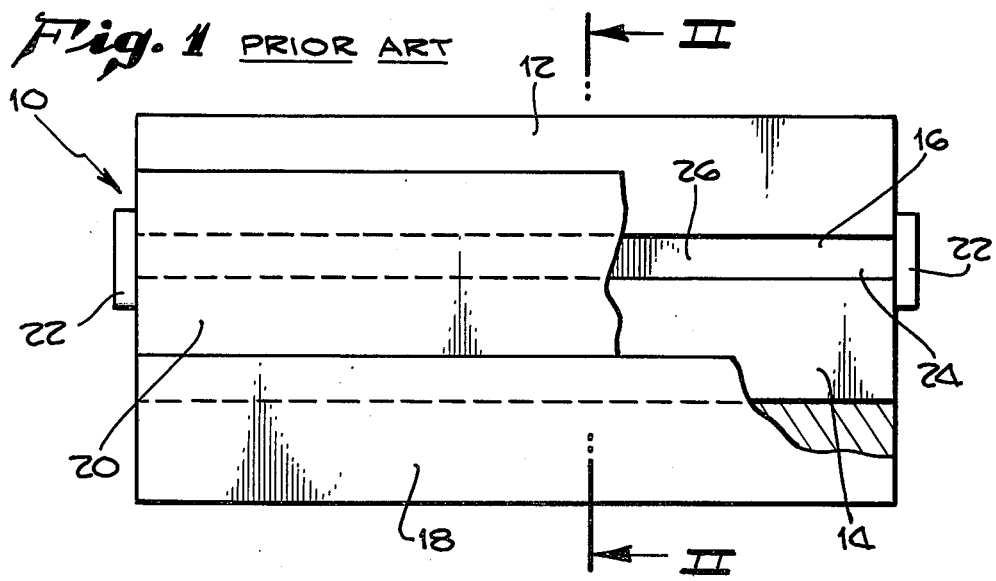
FIG. 1 is a simplified, partially cut away, side elevation of a prior art laser.
Figure 2:
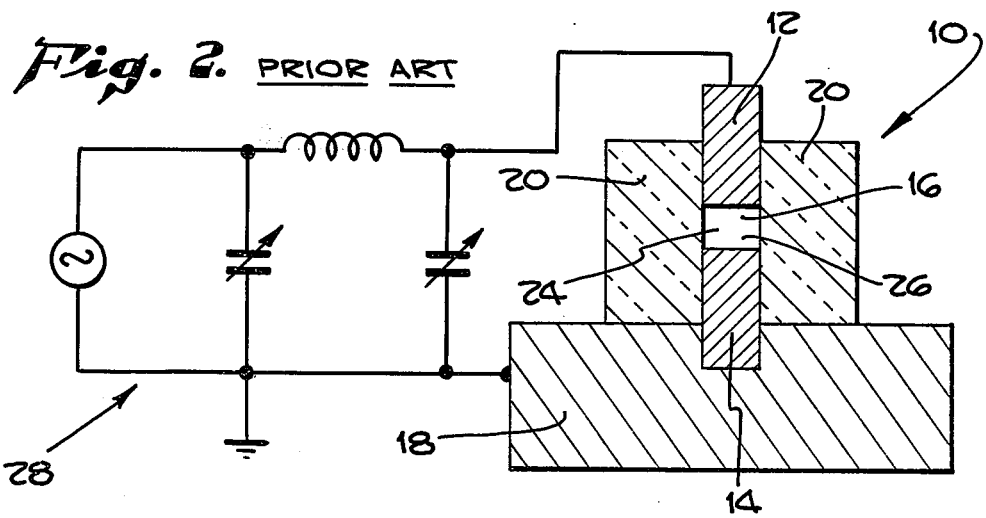
FIG. 2 is a cut away view through the laser of FIG. 1 in the plane II—II with the connection to the excitation circuit shown.

The laser 46 is excited by the circuit generally indicated as 66 comprising an r.f. source 68 connected on one side to ground and the metal sides 50 and bottom 52 of the enclosure 48 which, additionally, grounds the lower electrode 36. On the opposite side, the r.f. source 68 is connected through a "T" connection comprising capacitors 70 and 72 in combination with inductor 74 which is connected to the electrical connector 62. The use of the "T" connection, as opposed to the "hybrid $\pi$" connection of the prior art laser of FIG. 2, is a matter of personal choice and forms no part of the present invention.

The laser 46 of the present invention has several advantages including:

1. Lower fabrication costs. All waveguide previous lasers are some sort of ceramic for the waveguide walls. With the laser of the present invention, preparation of the curved metal electrodes is slightly more complicated, but this is more than offset by elimination of the costly and sometimes toxic ceramic walls.

2. Ruggedness. This is a result of removing the delicate waveguide ceramics of the prior art.

3. Longer life. While not completely demonstrated as yet, it is anticipated that elimination of the ceramics from the discharge region will lead to a reduction in lifetime limiting impurities.

4. Transverse flow. Because the discharge of the laser of the present invention is not enclosed, there is the above-described possibility of natural or forced convection to remove heat from the laser discharge region. Overheating of the laser gas is one of the most important features limiting output power, efficiency, and lifetime of conventional, prior art waveguide lasers. In $CO_2$ lasers, for example, thermo population of the lower laser level at typical operating temperatures of 550°–600° K., is known to cause a substantial drop in conversion efficiency as well as encouraging dissociation of the laser gas molecule.

5. Improved mode control. Transverse mode control is one of the major difficulties in the design and operation of conventional waveguide lasers. With the laser of the present invention, the parameters that govern the laser mode structure are completely independent from the parameters that govern the gas discharge conditions. Besides the added design flexibility this provides, the natural modes of a curved waveguide already have the desirable Gaussian beam form in one transverse direction dimension and may readily be transformed to Gaussian form in the other direction. In waveguide lasers, because of their small size and large mode spacing, mode control is important for both its spatial and spectral consequences.

6. Self-aligning. Since the curved laser waveguide can support modes which are not parallel to the waveguide axis, it tends to be much less sensitive to precise mirror alignment. In actual testing of the laser of the present invention, the applicants herein found that misalignment by as much as 1° had little effect on the laser's output power. This added advantage of insensitivity to misalignment should further increase interest in the laser of the present invention for application in adverse environments.

Wherefore, having thus described our invention, we claim:

1. In an r.f. excited metal waveguide laser having two parallel, opposed, longitudinal electrodes to which r.f. energy is applied to excite the laser, the improvement comprising:
   (a) one of the electrodes being concave in the longitudinal direction having a radius of curvature r1 and also being concave in the transverse direction along its entire length with a radius of curvature r2 and, (b) the other of the electrodes being convex in the longitudinal and transverse directions with corresponding complementary radii of curvature to r1 and r2, respectively, whereby said one electrode also functions as a waveguide for the laser light beam.

2. The improvement to a laser of claim 1 wherein:
said other electrode is narrower then said one electrode at the opposed points of transverse curvature.

3. The improvement to a laser of claim 1 wherein:
(a) one of the two electrodes is carried by the bottom of a metal structure comprising the bottom and the sides of a sealed enclosure for containing laser gas; and,
(b) the other of the two electrodes is carried by a plate of dielectric materials sealably closing the top of said enclosure.

4. The improvement to a laser of claim 3 and additionally comprising:
means for circulating laser gas within said enclosure through the discharge region between the opposed surfaces of the electrodes.

5. In an r.f. excited metal waveguide laser having two parallel, opposed, longitudinal electrodes to which r.f. energy is applied to excite the laser, the improvement comprising:
one of the two electrodes having a surface in opposition to the other electrode to longitudinally guide a laser beam developed in the discharge region between the two electrodes, said other electrode being the top electrode which is considerably thinned where the opposed, parallel adjacent surfaces of said electrodes are in opposition to each other.

6. The improvement to a laser of claim 5 wherein:
(a) one of the electrodes is concave in the longitudinal direction having a radius of curvature r1 and is also concave in the transverse direction along its entire length with a radius of curvature r2; and,
(b) the other of the electrodes is convex in the longitudinal and transverse directions with corresponding radii of curvature r1 and r2, respectively.

7. The improvement to a laser of claim 5 wherein:
(a) one of the two electrodes is carried by the bottom of a metal structure comprising the bottom and sides of a sealed enclosure for containing laser gas; and,
(b) the other of the two electrodes is carried by a plate of dielectric material sealably closing the top of said enclosure.

8. The improvement to a laser of claim 7 and additionally comprising:
means for circulating laser gas within said enclosure through the discharge region between the opposed surfaces of the electrodes.

9. In an r.f. excited metal waveguide laser the improvement comprising:
(a) a sealable metal box having a bottom and side walls;
(b) a top of a dielectric material vacuum tight and sealing said box;
(c) a laser beam output coupler disposed in one of said side walls of said box;

(d) a laser beam mirror disposed in the other of said side walls of said box in parallel opposition to said coupler;
(e) a first longitudinal electrode carried by said bottom of said box with its top surface longitudinally aligned between said coupler and said mirror;
(f) a second longitudinal electrode carried by said top of said box with its bottom surface longitudinally aligned between said coupler and said mirror and also being in parallel, spaced, opposing relationship to said top surface of said bottom electrode to form a discharge region therebetween, one of said opposed surfaces longitudinally guiding a laser beam developed in the discharge region between the two electrodes.

10. The laser of claim 9 wherein:
(a) one of the electrodes is concave in the longitudinal direction having a radius of curvature r1 and is also concave in the transverse direction along its entire length with a radius of curvature r2; and,
(b) the other of the electrodes is convex in the longitudinal and transverse directions with corresponding radii of curvature r1 and r2, respectifully.

11. The laser of claim 9 wherein:
said other electrode is narrower than said one electrode at the opposed points of transverse curvature.

12. The laser of claim 9 wherein:
(a) one of the two electrodes is carried by the bottom of the box; and,
(b) the other of the two electrodes is carried by the top of the box.

13. The laser of claim 12 and additionally comprising:
means for circulating laser gas within said box through the discharge region between the opposed surfaces of the electrodes.

14. The method of producing a laser beam comprising the steps of:
(a) forming one side of a first longitudinal electrode into a waveguide;
(b) positioning a second longitudinal electrode with one of its sides in parallel, spaced relationship to said one side of said first electrode to form a discharge region therebetween;
(c) disposing a laser gas in said discharge region; and,
(d) exciting said electrodes with r.f. energy.

15. The method of claim 14 wherein said forming step comprises the steps of:
(a) forming said one side to have a concave arc of curvature in the longitudinal direction; and,
(b) forming said one side to have a constant concave arc of curvature in the transverse direction.

16. The method of claim 14 and additionally including the steps of:
(a) forming a vacuum-tight enclosure having metal sides, a metal bottom, and a top of a dielectric material;
(b) positioning a laser beam output coupler in the sides of the enclosure;
(c) positioning a laser beam mirror in the sides of the enclosure in parallel opposition to the coupler;
(d) attaching one of the electrodes to the bottom of the enclosure in longitudinal allignment between the coupler and the mirror;
(e) attaching the other of the electrodes to the top of the enclosure; and,
(f) disposing laser gas within the enclosure.

17. The method of claim 16 and additionally comprising the step of:
continuously moving the laser gas by forced convection through the enclosure to pass it through the discharge region to cool the electrodes.

18. The method of claim 16 and additionally comprising the step of:
continuously moving the laser gas by natural convection through the enclosure to pass it through the discharge region to cool the electrodes.

* * * * *